United States Patent [19]

Hanscom et al.

[11] Patent Number: 4,731,815
[45] Date of Patent: Mar. 15, 1988

[54] RESET SYSTEM FOR TELEPHONE ANSWERING MACHINE IN THE EVENT OF A POWER FAILURE

[75] Inventors: Bradford E. Hanscom, Downey; Gerald L. Mock, Corona, both of Calif.

[73] Assignee: Fortel Corporation, Compton, Calif.

[21] Appl. No.: 867,196

[22] Filed: May 28, 1986

[51] Int. Cl.⁴ .............................................. H04M 1/65
[52] U.S. Cl. ........................................ 379/79; 379/70
[58] Field of Search ........................ 379/70, 74, 77, 90, 379/360, 374, 360, 379

[56] References Cited

U.S. PATENT DOCUMENTS 4,263,481  4/1981  Ho et al. ................................ 379/80
4,469,919  9/1984  Nakamura et al. .................... 379/77

*Primary Examiner*—Raymond F. Cardillo
*Assistant Examiner*—James E. Tomassini
*Attorney, Agent, or Firm*—Keith D. Beecher

[57] ABSTRACT

A reset system for a telephone answering machine which, in the event of power failure, or disconnection from the power source, will reset the telephone answering machine when power is restored to the condition it was in prior to the power failure. The system is applicable to both single tape machines in which the outgoing announcement and incoming messages are all recorded on one magnetic tape, and dual tape machines in which the outgoing announcements are recorded on one magnetic tape and the incoming messages are recorded on a second magnetic tape. The system of the invention serves to determine whether there were incoming messages on the incoming message tape when the power failed and if so, the end of the last recorded incoming message is located so that when power is restored the incoming message tape can be set to the same position it was in when power was lost.

4 Claims, 5 Drawing Figures

RESET SYSTEM FOR TELEPHONE ANSWERING MACHINE IN THE EVENT OF A POWER FAILURE

BACKGROUND OF THE INVENTION

The system of the invention may be incorporated into telephone answering machines of the type including an outgoing message magnetic tape mechanism in which an announcement is recorded on a magnetic tape, and which is activated during an announcement interval in response to ring signals received over the telephone line to cause the recorded announcement to be transmitted over the telephone line to the calling party during that interval; and an incoming message magnetic tape mechanism in which incoming messages are recorded in sequence on a second magnetic tape.

The system of the invention may also be incorporated into telephone answering machines in which the outgoing message and incoming messages are recorded on a single tape in a single magnetic tape mechanism; or one in which the outgoing message is recorded in a solid state memory; and in other types of telephone answering machines.

The system of the invention also finds application in telephone answering machines which are equipped with a control system which causes the telephone answering machine to require a relatively large number of ring signals before it will seize the telephone line if no incoming messages have been recorded; but which requires a lesser number of ring signals to seize the telephone line when one or more incoming messages have been received and recorded. Such a control system permits the user to call his machine by long distance from a remote location in order to pick up any messages that might have been recorded on the machine, and if there are not messages to hang up before the machine seizes the telephone line and thus avoid toll charges. When the system of the invention is used in such a telephone answering machine, when power is restored after a power failure, and if there are incoming messages on the machine, the system of the invention automatically sets the machine to respond to the lesser number of ring signals.

The system of the invention also finds applications in a telephone answering machine which is equipped with an indicator lamp that, for example, is continuously energized if there are no incoming messages recorded on the machine, but which flashes if one or more incoming messages have been received and recorded, so as to enable the user at a glance to determine whether there are any messages on the machine. When the system of the invention is incorporated into such a telephone answering machine, and when power is restored after a power failure, and if there are incoming messages recorded in the machine, the system of the invention will cause the indicator lamp to flash.

In addition, the system of the invention may be incorporated into a telephone answering machine which is equipped with a call counter that indicates to the user how many incoming messages have been received and are recorded on the machine. Again, when power is restored after a power failure, the system of the invention will set the call counter to properly indicate the number of messages which have been received and which are recorded on the incoming message tape prior to the power failure.

Most present-day telephone answering machines are controlled by a microcomputer, and when such telephone answering machines are first energized, the microcomputer goes through a reset routine during which it checks both the outgoing message tape mechanism and the incoming message tape mechanism, and sets both tape mechanisms to their "home" or "origin" positions; and then sets the machine to its "auto answer" mode ready to respond to the first telephone call. The microcomputer in such machines also automatically sets the ring control system to its multiple ring condition, the call indicator lamp to its continuously energized condition, and the call counter to zero, when the machine is first energized.

In the prior art machines, when the telephone answering machine is first plugged into the electrical outlet the internal microcomputer causes both the outgoing message tape and the incoming message tape to be set to their "home" or origin position, the ring control system to be automatically reset to its multiple ring state, the call indicator lamp to be set to its continuous state, and the call counter to be set to zero. However, in the prior art machines the foregoing operations also occur when power is restored after a power failure, and this means that any incoming messages that had been recorded on the machine prior to the power failure are lost.

As described above, the system of the present invention provides a control for the telephone answering machine such that whenever power is applied to the machine, the microcomputer first determines if any messages had previously been recorded on the incoming message tape. If such is the case, the incoming message tape is set to a position adjacent to the end of the last incoming message recorded on the tape; the ring control system is set to cause the telephone answering machine to seize the telephone line when the lesser number of rings is received; the call indicator lamp is set to its flashing state; and the call counter is set to indicate the number of incoming messages which had previously been recorded.

In accordance with the present invention, this is achieved by recording data in the form, for example, of a series of one's and zero's near the beginning of the incoming message tape, and this data represents the tape pulse counts to the end of the last incoming message recorded on the incoming message tape, the data being changed each time a new incoming message is recorded on the incoming message tape. Then, when power is lost and re-applied, the microcomputer rewinds the incoming message tape to its origin position and reads the data, and it then restores the incoming message tape counter to its state prior to power failure, and moves the incoming message tape to the corresponding position adjacent to the end of the last incoming message recorded on the tape. Also, the microcomputer causes the control and indicator mechanisms to be restored to the state they were in prior to the power failure.

In the case of the single tape machine, in which the outgoing announcement and incoming messages are all recorded on a single tape, the aforesaid data is recorded at the beginning of the tape and represent the tape pulse counts for the end of the outgoing message, and also the tape pulse counts for the end of the incoming messages. Then when power is lost and restored, the microcomputer rewinds the tape and reads the data on the tape and uses that data to restore both the outgoing announcement and incoming tape pulse counters in the microcomputer which controls the tape mechanism so that the tape is in the exact position it was in prior to the loss of power.

It is, accordingly, an object of the present invention to provide a relatively simple system in a telephone answering machine which responds, when power is restored after a power failure, to return the machine to exactly the condition it was in just prior to the power failure.

The present invention is generally similar to the invention disclosed and claimed in copending application Ser. No. 840,006 filed Mar. 17, 1986 in the name of Gerald L. Mock, and assigned to the present assignee.

DETAILED DESCRIPTION OF THE ILLUSTRATED EMBODIMENT

Only those portions of the circuits of FIGS. 1A, 1B, 1C and FIGS. 2A and 2B which are necessary for the complete and full understanding of the control system of the present invention will be described herein.

Figure 1A:
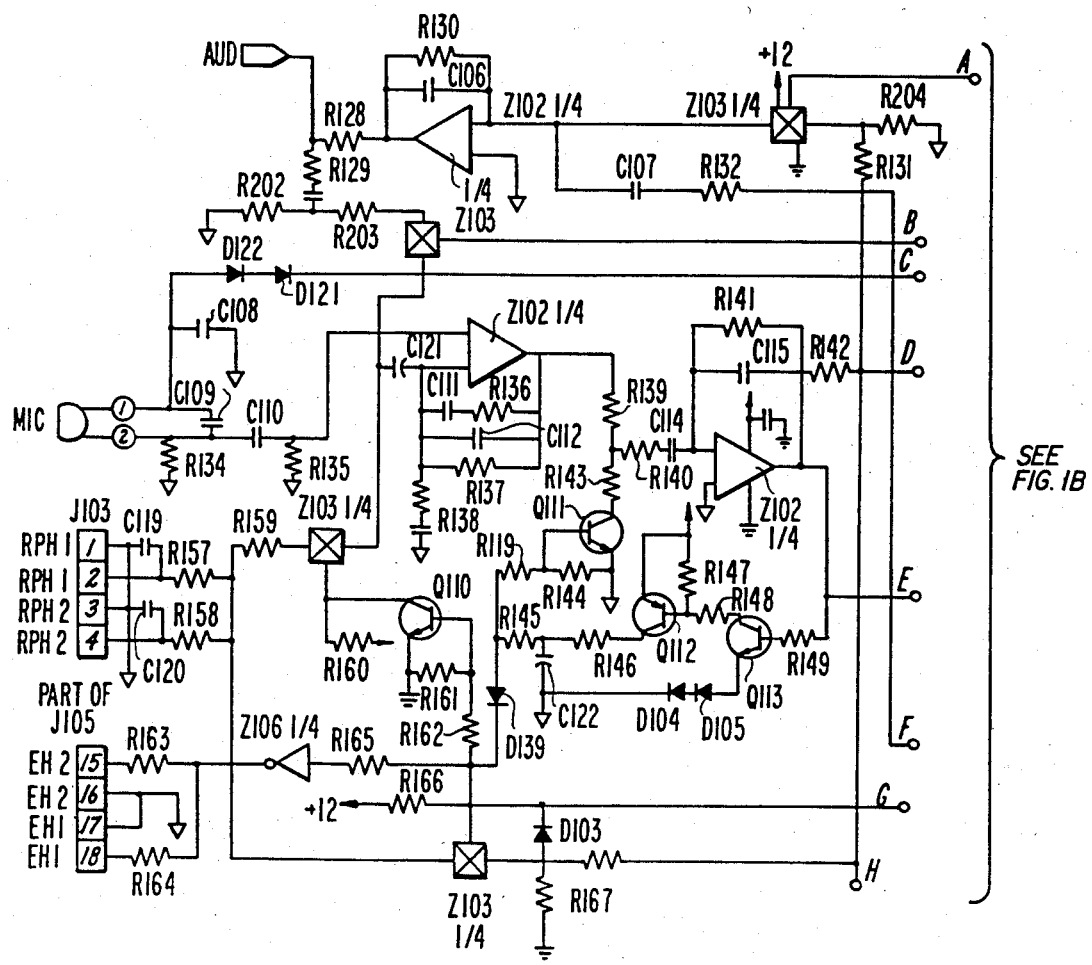
FIGS. 1A, 1B and 1C together constitute a circuit diagram of a telephone answering machine which incorporates the system of the invention.
Figure 1B:
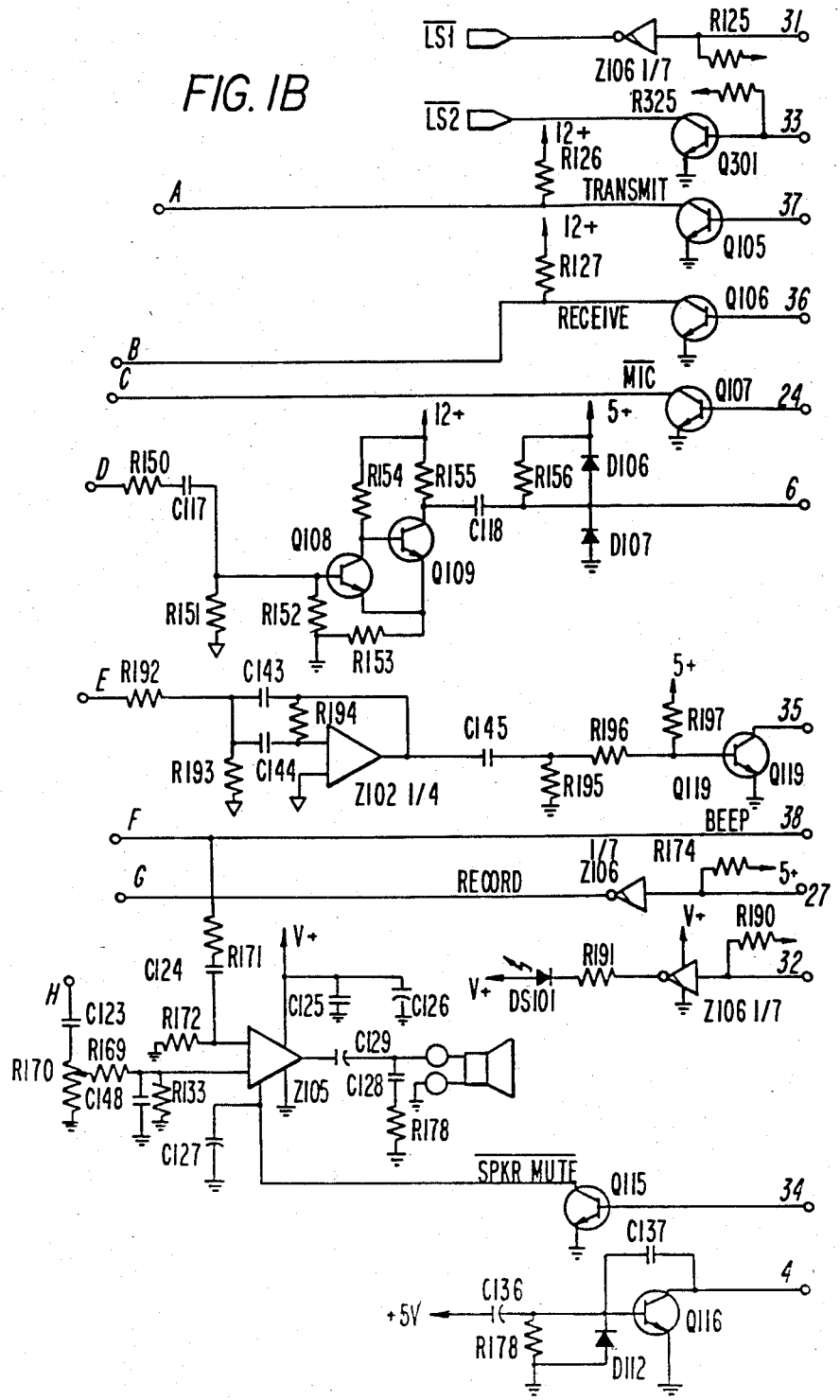
Figure 1C:
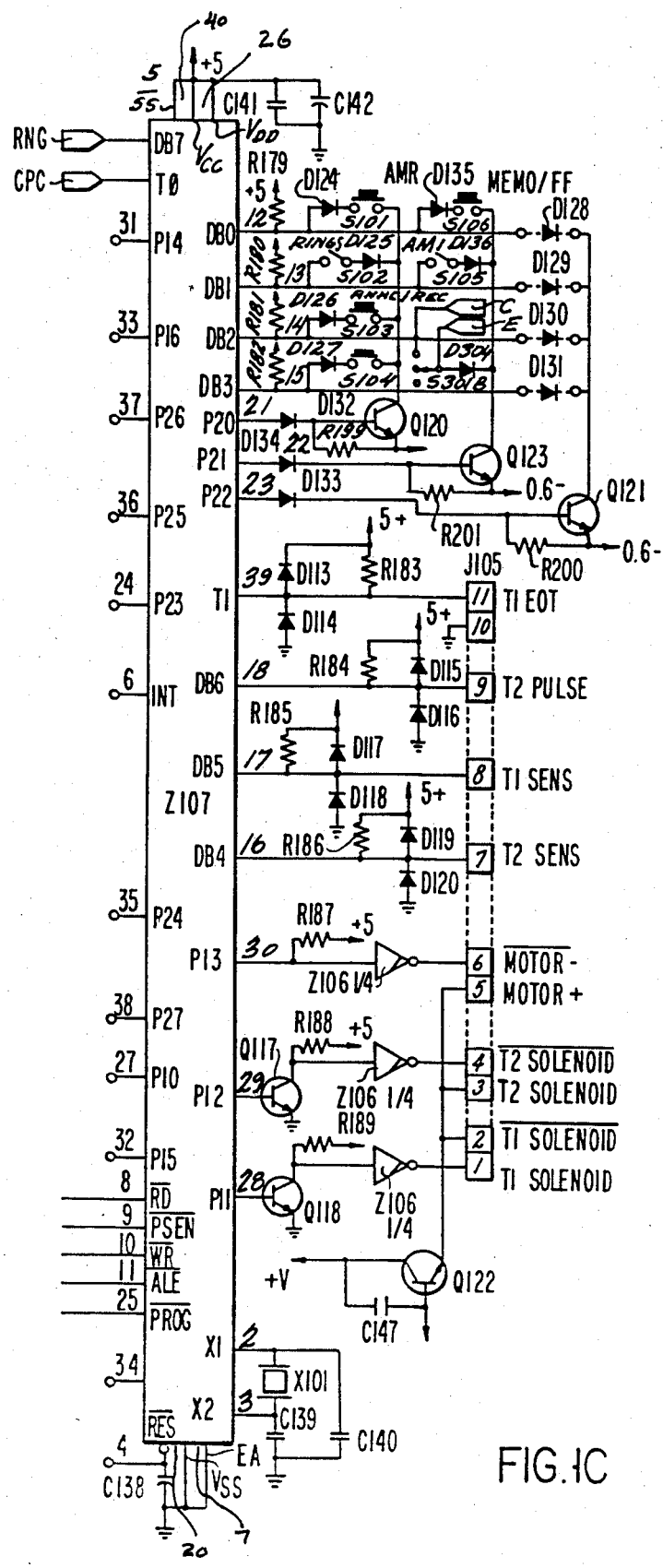

The circuit of FIGS. 1A, 1B and 1C includes a microcomputer Z107 (FIG. 1C) which may be of the type designated 8050. When power is applied to the telephone answering machine, a 5-volt voltage is introduced to a differentiator circuit C136 and R178 to deliver a pulse of approximately 100 milliseconds to the base of transistor Q116. The differentiator circuit is made up of a 10 microfarad capacitor C136 and a 10 kilo-ohm resistor R178. This pulse will render transistor Q116 conductive for that time period, holding the RESET pin 4 of microcomputer Z107 low, setting up the reset operation.

When reset is released, the microcomputer will undergo an initial routine operation, during which it causes the announcement tape (T1) to assume its "home" position. Then, in accordance with the present invention, the microcomputer will set the incoming message tape (T2) to its rewind mode. After the incoming message tape has been rewound to its "home" position, the data at the beginning of the tape is read, and the microcomputer sets its internal incoming message tape countner to a setting corresponding to the end of the last incoming message recorded on that tape. The microcomputer will then cause the incoming message tape to move forward to the end of the last incoming message recorded on the tape, so that the previously recorded incoming messages may be preserved. Then, the telephone answering machine is set to its automatic answer mode, in readiness for the next call on the telephone line.

The data at the beginning of the incoming message tape is recorded by using the beep oscillator of the machine, and the data is up-dated each time an incoming message is stored on the incoming message tape. That is, the data is updated each time the pulse count for the incoming message tape changes to represent the position on the tape corresponding to the end of the last recorded incoming message. This pulse count originates from pulses derived from a read switch connected to the incoming message tape mechanism, as will be described.

The telephone answering machine also includes light emitting diode (LED) DS101 (FIG. 1B) which is powered by a circuit connected to pin 32 of microcomputer Z107. Whenever received messages are stored on the incoming message tape, the LED flashes to indicate that fact to the user. In the system of the invention, when power is re-applied to the telephone answering machine, and when the mirocomputer Z107 determines that messages had previously been recorded on the incoming message tape, the LED DS101 is set to its flashing state. Otherwise, the LED is set to its continuously energized state.

The microcomputer Z107 also includes an internal call counter which counts each incoming message recorded on the incoming message tape, and indicates the number of recorded incoming messages to the user by means of an appropriate display. When power is re-applied to the machine after a power failure, and when the microcomputer determines that previously messages had been recorded on the incoming message tape by reading the data recorded at the beginning of the tape, the call counter is set to its previous count, indicating the number of messages previously recorded on the incoming message tape.

The microcomputer Z107 controls the magnetic tape mechanism by way of a connector J105 (FIG. 1C). When pin 30 goes high, the drive motor for both magnetic tape mechanisms is activated. When pin 29 goes high, the T2 solenoid is energized to activate the incoming message magnetic tape mechanism; and when pin 28 is high, the outgoing message tape mechanism solenoid is activated. The end of the outgoing message tape is sensed at pin 39, and the pulses from the incoming message tape mechanism are applied to pin 18.

The pulses from the incoming message tape mechanism originate from a reed switch on the mechanism which senses motion thereof, with the reed switch providing four pulses per revolution of the incoming message tape mechanism. The T1 sense signal applied to pin 8 of the connector J105 is fed to pin 17 of the microcomputer, and indicates to the microcomputer that the T1 head is engaged. Likewise, the T2 sense signal applied to pin 7 of the connector informs the microcomputer that the incoming message tape head is engaged.

A keyboard matrix is connected to pins 12–15 of the microcomputer Z107, the various columns of the matrix being selected through transistors Q120, Q123 and Q121 from pins 21, 22 and 23 of the microcomputer. The microcomputer scans the keyboard at regular intervals to determine the states of the various switches. The AMR pushbutton switch of the keyboard permits the user to play back all of the messages accumulated on the incoming message tape, merely by pressing the pushbutton switch and releasing it. The ring selection switch is closed after a ring selection has been made by the microcomputer Z107, selecting the number of rings to be received before the telephone answering machine will answer.

The ANNC/REC pushbutton switch is closed to set the machine to a mode in which a new announcement may be recorded. The STBY pushbutton switch, when activated, disengages the telephone answering machine from the telephone line. The MEMO/FF switch, when depressed, allows a memo to be dictated on the tape if in the "Answer" mode and performs "Fast Forward" while in the "Message Playback" mode. The AMI switch enables and disables the "Audible Message Indicator" beep. The diodes D128–D130 are selectively connected to establish a remote code for access to the machine.

Ring signals received over the telephone line appear across the tip and ring terminals 3 and 4 of connector J106, and are applied to operational amplifier Z101 through 22 megohm resistors R102 and R103. These resistors are connected to differential amplifier Z101 (pins 2 and 3). Due to the values of R104 and R105, the output at pin 1 of Z101 is approximately 0.045 times the input voltage. This allows the high voltages that appear on the telephone line to be handled by the unit.

The next two stages of Z101 form an absolute value amplifier. The stage is set up such that regardless of the polarity of tip and ring, the difference voltage will always appear in a positive direction at pin 14 of Z101. The overall gain of the absolute value amplifier is 4.7. The output from pin 14 is fed to transistor Q104 through a voltage divider R112 and R113. The output of Q104 (marked RNG in FIG. 2B) is then coupled to the microcomputer input pin 19 in FIG. 1C. With the gain structure as described and the attenuation factor of R112 and R113, Q104 will be saturated for DC voltages greater than 25 volts at tip and ring. This provides an on-hook/off-hook indication to the microcomputer which is used for determination of dial tap.

Figure 2A:
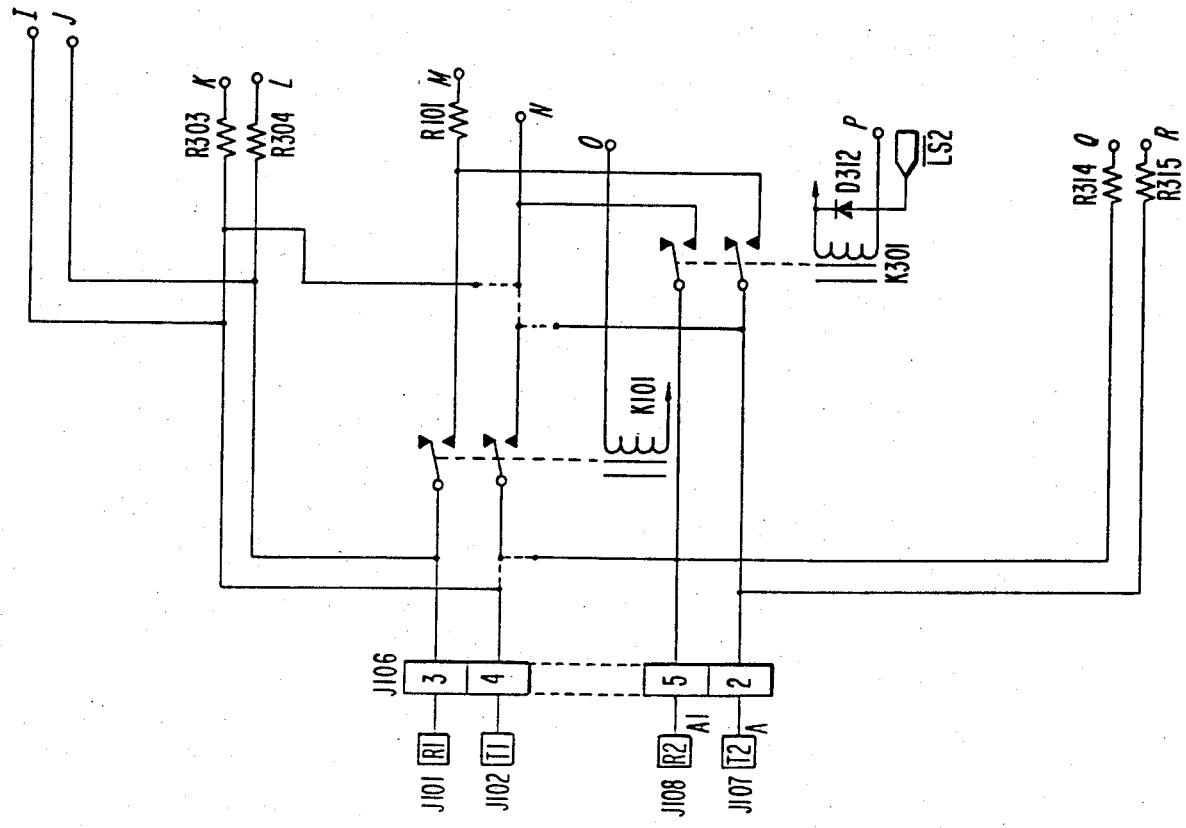
FIGS. 2A and 2B together constitute a circuit diagram of another portion of the telephone answering machine.
Figure 2B:
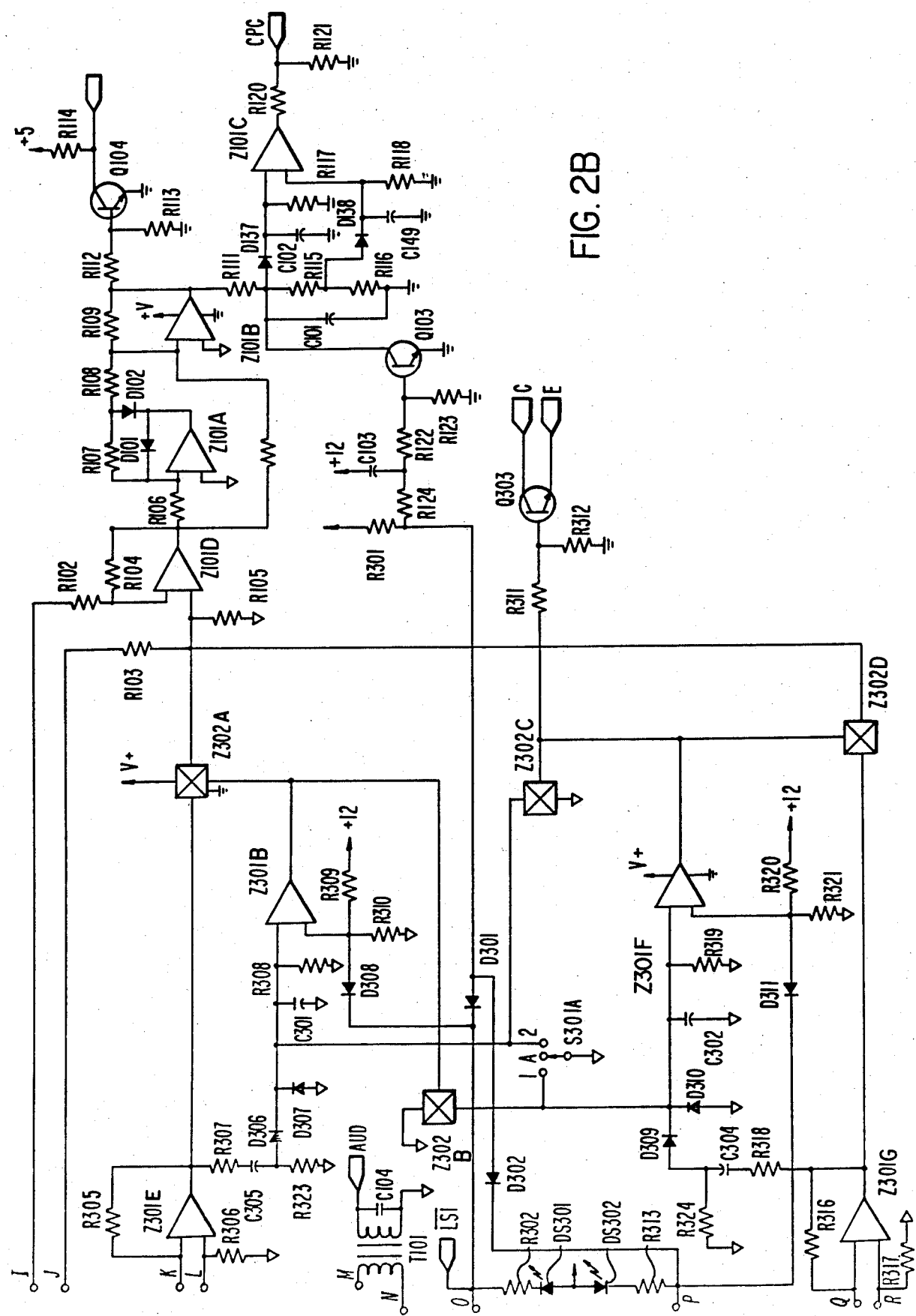

During ringing, transistor Q104 of FIG. 2B will be turned off and on. This toggling will be noted by the microcomputer and upon its cessation, the logic level at RNG (pin 19) of FIG. 1C will be examined. If the logic level is low, the toggling will be considered a valid ring. If the port is high, however, it will be assumed that toggling was caused by dial tap.

Upon the receipt of a valid ring signal, pin 37 of the microcomputer will go high to close the transmit circuitry of the telephone answering machine, so that the announcement recorded on the announcement tape may be transmitted to the calling party. At the end of the announcement interval, pin 37 will go low and pin 36 will go high, so that the telephone answering machine is set to receive the incoming message and cause the incoming message to be recorded on the incoming message tape T2.

As discussed above, the microcomputer Z107 responds only after a relatively large number of rings have been received, when no incoming messages have been recorded on the incoming message tape. However, after one or more messages have been recorded on the incoming message tape, the microcomputer causes the machine to respond to a lesser number of rings.

Accordingly, when a user remotes the machine over a long distance telephone line, if no messages have been received and recorded on the machine, he may hang up after the number of rings exceeds the lesser number, and he can thereby avoid toll charges. As also described, the system of the invention causes the toll saver system within the microcomputer to revert to the lesser number of rings state in the event that power is lost after incoming messages have been recorded on the incoming message tape.

The invention provides, therefore, a control system incorporated into a telephone answering machine, which operates in the event of power failure to cause the machine to revert to the state it was in just before the power failure, after power has been restored.

It will be appreciated that while a particular embodiment of the invention has been shown and described, modifications may be made. It is intended in the following claims to cover all modifications which come within the true spirit and scope of the invention.

We claim:

1. In a telephone answering machine which includes a magnetic tape mechanism for recording incoming messages received over a telephone line sequentially on a storage means comprising a magnetic tape, a microcomputer, and first circuit means connected to the microcomputer and to the magnetic tape mechanism for setting the magnetic tape mechanism to an origin position during a reset operation occurring when power is applied to the telephone answering machine, the combination of: second circuit means connected to said microcomputer and to said magnetic tape mechanism to cause said magnetic tape to move away from said origin position after the reset operation to enable particular data recorded on the magnetic tape to be sensed; and third circuit means coupled to said magnetic tape and to said microcomputer and responsive to the particular data recorded on said magnetic tape to introduce a control signal to said microcomputer indicating the presence of incoming messages stored on said magnetic tape prior to said magnetic tape mechanism being set to said origin position, said microcomputer responding to said control signal to cause said third circuit means to return said magnetic tape to a position displaced from its origin position and corresponding to the number of incoming messages recorded thereon; and fourth circuit means connecting said microcomputer to said magnetic tape mechanism for changing the particular data on said magnetic tape each time a new incoming message is recorded on said magnetic tape.

2. The combination defined in claim 1, in which said telephone answering machine responds to ring signals received over the telephone line to seize the telephone line, and in which said microcomputer includes a control system having a first operational mode which causes said telephone answering machine to seize the telephone line after a predetermined number of ring signals have been received if no incoming messages had previously been stored in said storage means, and having a second operational mode which causes the telephone answering machine to seize the telephone line after a lesser number of ring signals have been received if one or more incoming messages had previously been stored in said storage means, and in which the signals introduced to said microcomputer by said third circuit means cause said microcomputer to set said control system to its second operational mode during said reset operation if one or more incoming messages had previously been received and stored in said storage means.

3. The combination defined in claim 1, and which includes circuitry connected to said microcomputer and including an indicator lamp, said microcomputer setting said lamp to a first visual state if no incoming messages have been stored in said storage means, and setting said lamp to a second visual state if one or more incoming messages have been stored in said storage means, and in which the signals introduced to said microcomputer by said third circuit means causes said microcomputer to set the indicator lamp to its second visual state during said reset operation if one or more incoming messages had previously been received and stored in said storage means.

4. The combination defined in claim 1, in which said microcomputer includes a counter for indicating the number of incoming messages stored in said storage means; and in which the signals introduced to said microcomputer by said third circuit means causes said microcomputer to set the counter during said reset operation to a count representing the number of incoming messages previously stored in said storage means.

* * * * *